United States Patent
Lin

(10) Patent No.: US 10,451,927 B2
(45) Date of Patent: Oct. 22, 2019

(54) LIQUID CRYSTAL DISPLAY PANEL AND DISPLAY DEVICE

(71) Applicant: XIAMEN TIANMA MICRO-ELECTRONICS CO., LTD., Xiamen (CN)

(72) Inventor: Yan Lin, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 128 days.

(21) Appl. No.: 15/789,839

(22) Filed: Oct. 20, 2017

(65) Prior Publication Data

US 2018/0341141 A1  Nov. 29, 2018

(30) Foreign Application Priority Data

May 26, 2017 (CN) .......................... 2017 1 0385242

(51) Int. Cl.
 *G02F 1/1339* (2006.01)
 *G02F 1/1335* (2006.01)
 *G02F 1/1343* (2006.01)

(52) U.S. Cl.
 CPC .... *G02F 1/13394* (2013.01); *G02F 1/133512* (2013.01); *G02F 1/133514* (2013.01); *G02F 1/134336* (2013.01); *G02F 2001/13396* (2013.01); *G02F 2001/134345* (2013.01)

(58) Field of Classification Search
 None
 See application file for complete search history.

(56) References Cited

U.S. PATENT DOCUMENTS

| 9,176,339 | B2 * | 11/2015 | Kim ................. | G02F 1/133512 |
| 2010/0165266 | A1 * | 7/2010 | Sakata ............ | B29D 11/00634 349/106 |
| 2015/0205160 | A1 * | 7/2015 | Kim ................. | G02F 1/133512 349/42 |
| 2015/0370105 | A1 * | 12/2015 | Hong ............... | G02F 1/136209 349/43 |
| 2017/0146869 | A1 * | 5/2017 | Hirosawa ......... | G02F 1/133512 |
| 2017/0261796 | A1 * | 9/2017 | Tamaki ............ | G02F 1/133512 |

(Continued)

FOREIGN PATENT DOCUMENTS

| CN | 1223384 A | 7/1999 |
| CN | 1523408 A | 8/2004 |

(Continued)

*Primary Examiner* — Ryan Crockett
(74) *Attorney, Agent, or Firm* — Alston & Bird LLP

(57) ABSTRACT

A liquid crystal display panel and a display device are disclosed. The liquid crystal display panel includes an array substrate and an upper substrate arranged opposite to each other, and a liquid crystal layer, a spacer layer including primary spacers and secondary spacers, and a black matrix layer over the spacer layer. The overlapping area between one of the plurality of black matrix elements and a green sub-pixel near one of the plurality of primary spacers below said matrix element forms a first overlap area, wherein an overlapping area between one of the plurality of black matrix elements and a green sub-pixel near one of the plurality of secondary spacers below said matrix element forms a second overlap area; and the first overlap area equals the second overlap area.

13 Claims, 14 Drawing Sheets

(56) References Cited

U.S. PATENT DOCUMENTS

2017/0299910 A1\* 10/2017 Sugiyama ........... G02F 1/13394
2018/0292704 A1\* 10/2018 Hirosawa .......... G02F 1/133512

FOREIGN PATENT DOCUMENTS

| CN | 1667474 A | 9/2005 |
|---|---|---|
| CN | 103513470 A | 1/2014 |
| CN | 103885260 A | 6/2014 |
| CN | 104020605 A | 9/2014 |
| CN | 104536189 A | 4/2015 |
| CN | 104914613 A | 9/2015 |
| CN | 105096884 A | 11/2015 |
| CN | 105807484 A | 7/2016 |
| CN | 105892185 A | 8/2016 |
| CN | 106526990 A | 3/2017 |
| JP | 60 263122 A | 12/1985 |

\* cited by examiner

LIQUID CRYSTAL DISPLAY PANEL AND DISPLAY DEVICE

This application claims the benefit of Chinese Patent Application No. CN201710385242.0, filed with the Chinese Patent Office on May 26, 2017, which is hereby incorporated by reference in its entirety.

FIELD

The present disclosure relates to the field of display technologies, and particularly to a liquid crystal display panel and a display device.

BACKGROUND

A liquid crystal display panel generally includes an array substrate and an opposite substrate arranged opposite to each other, and a layer of liquid crystal located between the array substrate and the opposite substrate. Typically the liquid crystal display panel is divided into a display area, and an edge frame area surrounding the display area where peripheral circuits are arranged. A frame sealing glue in the edge frame area seals the liquid crystals in the display area. Generally an electric field associated with images is applied to the display panel is controlled to enable light rays to be selectively transmitted through the display area so that an image is displayed. However no light can be transmitted through the edge frame area. As resolution of the liquid crystal display panel gets smaller, a phenomenon Mura (non-uniform display) occurs when black spots appear throughout a grayscale picture on the liquid crystal display panel affecting clarity of image display.

SUMMARY

A display panel is provided. The display panel has an array substrate and an upper substrate arranged opposite to each other; a liquid crystal layer; a spacer layer having a plurality of spacers underpinning the liquid crystal layer, wherein the plurality of spacers include a plurality of primary spacers and a plurality of secondary spacers; a sub-pixel layer on the array substrate comprising a plurality of sub-pixels in at least red, green, and blue color types, wherein the plurality of sub-pixels are arranged in columns and rows; and a black matrix layer comprising a plurality of black matrix elements over the spacer layer; wherein the liquid crystal layer, the spacer layer, the sub-pixel layer, and the black matrix layer are disposed between the array substrate and the upper substrate; wherein an overlapping area between one of the plurality of black matrix elements and a green sub-pixel near one of the plurality of primary spacers below said matrix element forms a first overlap area, wherein an overlapping area between one of the plurality of black matrix elements and a green sub-pixel near one of the plurality of secondary spacers below said matrix element forms a second overlap area; and wherein the first overlap area equals the second overlap area.

DETAILED DESCRIPTION OF THE EMBODIMENTS

Figure 1:
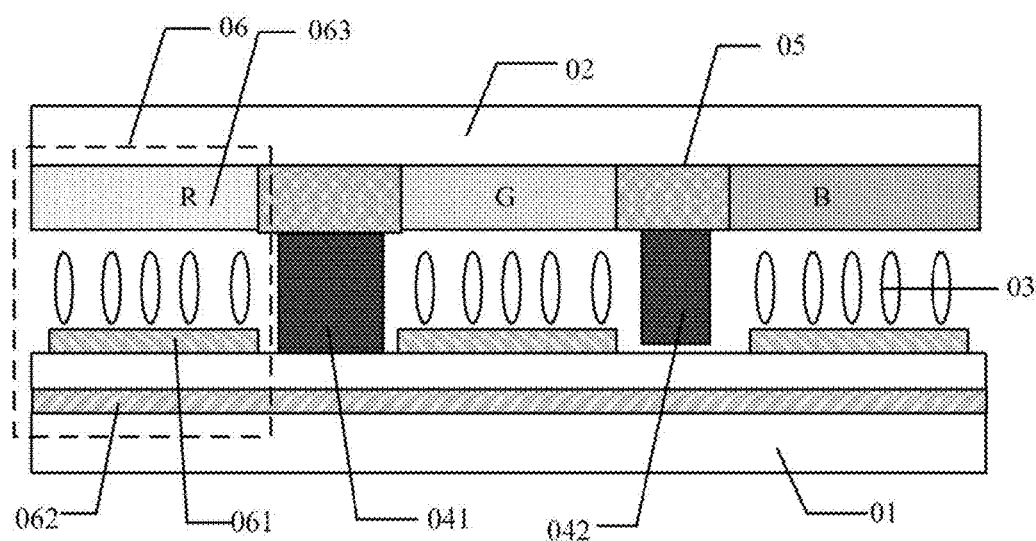
FIG. 1 is a cross sectional view of a liquid crystal display panel structure according to an embodiment of the disclosure.

Embodiments of the disclosure provide a liquid crystal display panel and a display device to address the Mura phenomenon on the existing liquid crystal display panel.

An embodiment of the disclosure provides a liquid crystal display panel including: an array substrate and an upper substrate arranged opposite to each other, and a liquid crystal layer; a spacer layer, and a black matrix layer covering the spacer layer, located between the array substrate and the upper substrate. The display further includes a plurality of sub-pixels between the array substrate and the upper substrate, the sub-pixels contain at least three types: the red sub-pixels, green sub-pixels, and blue sub-pixels; the spacer layer includes a plurality of primary spacers and a plurality of secondary spacers; and overlapping areas between the black matrix layer at the positions of the primary spacers, and the green sub-pixels, in the direction parallel to the array substrate are equal to overlapping areas between the black matrix element at the corresponding positions of the secondary spacers, and the green sub-pixels, in the direction parallel to the array substrate.

Correspondingly an embodiment of the disclosure further provides a display device including the liquid crystal display panel disclosed above according to the embodiment. If there is a difference between a black matrix overlapped area of one sub-pixel belonging to one color, at a position of a primary spacer black matrix element, and the areas of the sub-pixels occupied by the black matrix element at the corresponding positions of the secondary spacers, where there are larger placement areas of the primary spacers, then the brightness at the corresponding positions of the primary spacers may be lower than the brightness at the corresponding positions of the secondary spacers.

However the human eyes are more sensitive to green light in reality. the difference in brightness due to the difference in area is reflected on the sub-pixels in another color, then the difference in brightness may not be easily perceivable to the human eyes, and only if the difference in brightness is reflected on the green sub-pixels, then the visual difference in brightness may be obvious. Accordingly in the technical solutions according to the embodiments of the disclosure, the overlapping areas between the black matrix element at the corresponding positions of the primary spacers, and the green sub-pixels, in the direction parallel to the array substrate are equal to the overlapping areas between the black matrix element at the corresponding positions of the secondary spacers, and the green sub-pixels, in the direction parallel to the array substrate, that is, the areas of the green sub-pixels occupied by the black matrix element at the corresponding positions of the primary spacers are equal to the areas of the green sub-pixels occupied by the black matrix element at the corresponding positions of the secondary spacers, thus addressing the visual difference in brightness to the human eyes arising from the difference in placement area between the primary spacers and the secondary spacers so as to address the Mura phenomenon in the existing liquid crystal display panel.

In a liquid crystal display panel, in order to guarantee a uniform thickness of a liquid crystal layer, spacers have been arranged for supporting the liquid crystal layer, where the spacers include primary spacers as main supports and secondary spacers as supplemental supports. The inventors of the disclosure have identified from their researches on the existing liquid crystal panels that occurrence of the dark spots in the Mura phenomenon is consistent with the placement distribution of primary spacers in the liquid crystal display panel, that is, the Mura phenomenon in the display panel depends upon the arrangement of spacers. It is necessary to arrange the spacers in the display panel, so the Mura phenomenon cannot be addressed simply by removing the spacers. It has been discovered from further research that when spacers are placed between red sub-pixels and blue sub-pixels, a white picture without dark spots is being displayed. So regular dark spots may be shielded by the brightness of green sub-pixels so that the regular dark spots in the white picture are more invisible from the higher sensitivity of green by human eyes. While a green picture, a red picture, and a blue picture are being displayed respectively, regular dark spots are visible in a descending order of green picture, red picture, and blue picture. It has been identified from the researches that the regular dark spots will become more visible if there is a larger difference in placement areas of the primary spacers and the secondary spacers. Accordingly it has been identified from the researches above that the regular dark spots are displayed on the existing liquid crystal display panel due to both the difference in placement area between the primary spacers and the secondary spacers, and the placement of the spacers.

Further to the researches above, embodiments of the disclosure provide a liquid crystal display panel and a display device, where the Mura phenomenon on the existing liquid crystal display panel can be alleviated by setting the placement of spacers.

In order to make the objects, technical solutions, and advantages of the disclosure more apparent, the disclosure will be described below in further details with reference to the drawings, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure as claimed.

The shapes and sizes of respective components in the drawings are not intended to reflect their real proportions, but only intended to illustrate the contents of the disclosure.

Figure 2:
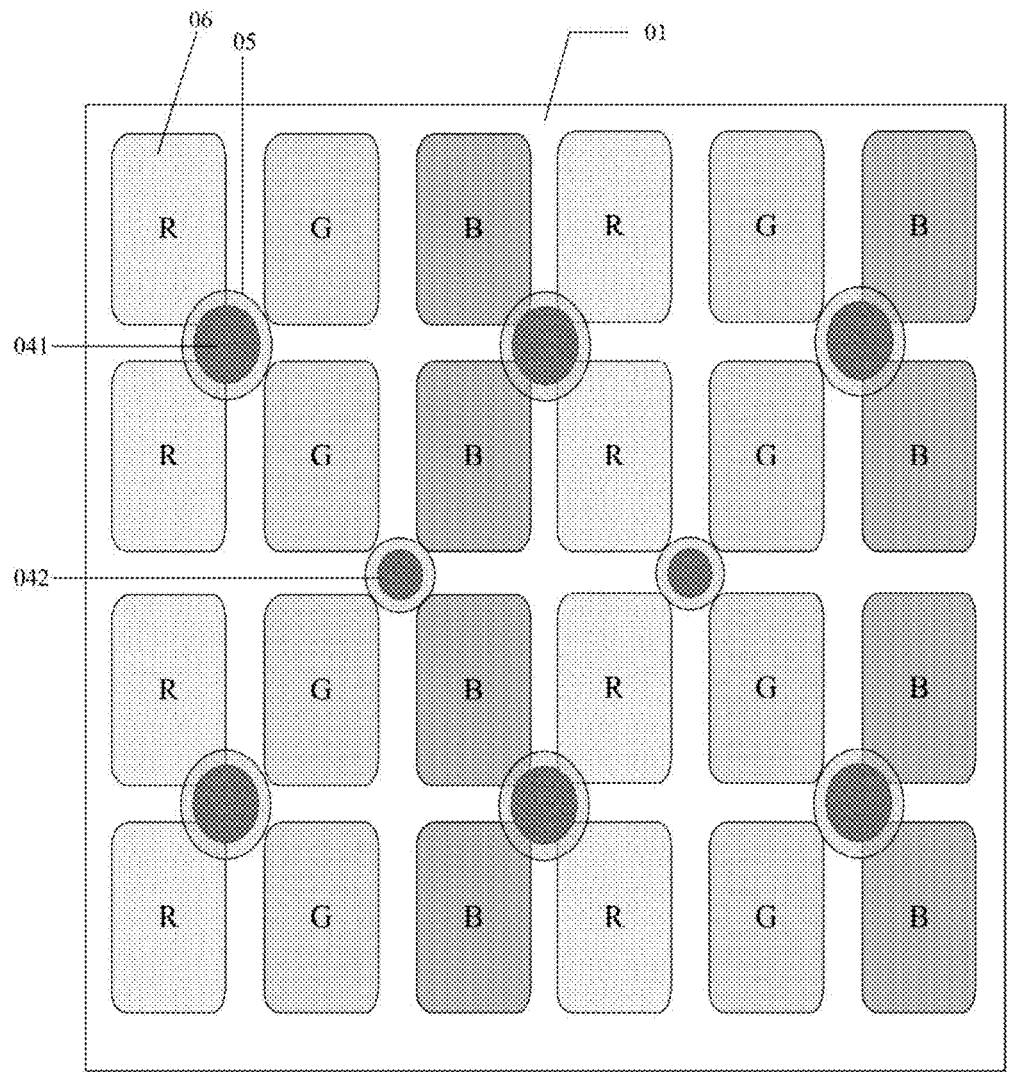
FIG. 2 is a top view schematic diagram of a liquid crystal display panel according to an embodiment of the disclosure.

An embodiment of the disclosure provides a liquid crystal display panel as illustrated in FIG. 1 and FIG. 2, where FIG. 1 is a sectional view of a schematic structural diagram of a liquid crystal display panel according to an embodiment of the disclosure, and FIG. 2 is a top view of a schematic structural diagram of a liquid crystal display panel according to an embodiment of the disclosure; and the liquid crystal display panel includes an array substrate 01 and an upper substrate 02 arranged opposite to each other, and a liquid crystal layer 03, a spacer layer having a plurality of spacers underpinning the liquid crystal layer, wherein the plurality of spacers include a plurality of primary spacers (041) and a plurality of secondary spacers (042), and a black matrix layer including a plurality of black matrix elements 05 over the spacer layer (041 and 042), all of which are located between the array substrate 01 and the upper substrate 02.

Where there are further arranged a sub-pixel layer including a plurality of sub-pixels 06 in at least red (R), green (G), and blue (B) color types, between the array substrate 01 and the upper substrate 02.

Where an overlapping area between one of the plurality of black matrix elements 05 and a green sub-pixel 06 near one of the plurality of primary spacers 041 below said matrix element 05 forms a first overlap area, where an overlapping area between one of the plurality of black matrix elements 05 and a green sub-pixel 06 near one of the plurality of secondary spacers 042 below said matrix element 05 forms a second overlap area, and the first overlap area equals the second overlap area.

Optionally, the overlapping area between each of the plurality of black matrix elements 05 and a green sub-pixel 06 near one of the plurality of primary spacers 041 below said matrix element 05 forms a first overlap area, and the overlapping area between each of the plurality of black matrix elements 05 and a green sub-pixel 06 near one of the plurality of secondary spacers 042 below said matrix element 05 forms a second overlap area, and the first overlap area equals the second overlap area.

The liquid crystal display panel according to the embodiment of the disclosure includes the array substrate and the upper substrate arranged opposite to each other, and the liquid crystal layer, the spacers, and the black matrix element black matrix elements covering the spacers, all of which are located between the array substrate and the upper substrate, where there are a plurality of sub-pixels at least in red, green, and blue arranged between the array substrate and the upper substrate; and the spacers include the primary spacers and the secondary spacers. If there is a difference between the areas of the sub-pixels occupied by the black matrix elements over the primary spacers, and the areas of the sub-pixels occupied by the black matrix elements over the secondary spacers, where there are larger placement areas of the primary spacers, then the brightness at the corresponding positions of the primary spacers may be lower than the brightness at the corresponding positions of the secondary spacers. However human eyes are sensitive to green light in reality, so if the difference in brightness due to the difference in area is reflected on the sub-pixels in another color, then the difference in brightness may not be easily perceivable to the human eyes, and only if the difference in brightness is reflected on the green sub-pixels, then the visual difference in brightness may be obvious. Accordingly in the technical solution according to the embodiments of the disclosure, the overlapping areas between the black matrix elements over the primary spacers, and the green sub-pixels, in the direction parallel to the array substrate are equal to overlapping areas between the black matrix elements over the secondary spacers, and the green sub-pixels, in the direction parallel to the array substrate, that is, the first overlap area equals the second overlap area, or in other words, an area of each green sub-pixel occupied by each black matrix element over one primary spacer is equal to an area of each green sub-pixel occupied by each black matrix element over one secondary spacers, thus addressing the visual difference in brightness to the human eyes arising from the difference in placement area between the primary spacers and the secondary spacers so as to address the Mura phenomenon in the existing liquid crystal display panel.

Particularly in the liquid crystal display panel according to the embodiments of the disclosure, the sub-pixels in at least red, green, and blue refer to at least red sub-pixels, green sub-pixels, and blue sub-pixels in the liquid crystal display panel, but there may be also sub-pixels in other colors as required in a design, e.g., white sub-pixels or yellow sub-pixels, although the embodiment of the disclosure will not be limited thereto.

It shall be noted that an overlapping area of two objects in the direction parallel to the array substrate as referred to in the liquid crystal display panel according to the embodiments of the disclosure refers to an overlapping area of positive projections of these two objects onto the array substrate. For example, the overlapping areas of the black matrix elements at the corresponding positions of the primary spacers, and the green sub-pixels in the direction parallel to the array substrate refer to overlapping areas of positive projections of the black matrix elements at the corresponding positions of the primary spacers onto the array substrate, and positive projections of the green sub-pixels onto the array substrate.

It shall be further noted that all the top views in the drawing of the disclosure are only intended to illustrate relative positional relationships between the spacers, the black matrix elements, and the sub-pixels in the direction parallel to the plane where the array substrate lies, but not intended to define relative positional relationships between the spacers, the black matrix elements, and the sub-pixels in the direction perpendicular to the plane where the array substrate lies, where the latter can be defined as in the existing liquid crystal display panel as needed in reality.

Particularly in the liquid crystal display panel according to the embodiments of the disclosure, the sub-pixels each generally include a pixel electrode, a common electrode, a color filter film, etc., and as illustrated in FIG. 1, for example, the pixel electrode 061 and the common electrode 062 are generally arranged on the array substrate 01, and the color filter film 063 is generally arranged on the upper substrate 02. Furthermore the common electrodes 062 are generally arranged in a layer as a whole, that is, the common electrodes 062 of all the sub-pixels 06 are connected in the same layer. Of course, the common electrodes can alternatively be arranged on the upper substrate, and the color filter films can alternatively be arranged on the array substrate (not illustrated), as needed in a design, although the embodiments of the disclosure will not be limited thereto.

In the liquid crystal display panel, the spacers may affect the distribution of an electric field therearound in such a way that an image cannot be displayed normally in a large area around the spacers, so the spacers, and the area around the spacers need to be covered by the black matrix elements. Optionally in the liquid crystal display panel according to the embodiments of the disclosure, as illustrated in FIG. 3 which is a schematic diagram of the size of an area of a spacer relative to a black matrix in a liquid crystal display panel according to an embodiment of the disclosure, a black matrix 05 at the corresponding position of a spacer 04 is extended outward relative to the spacer 04 by a width w of 9 μm to 12 μm.

Figure 3:
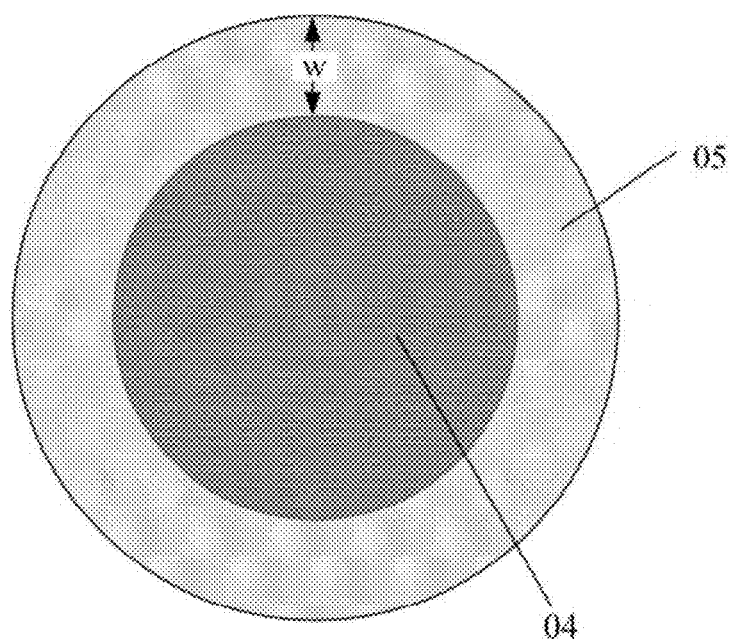
FIG. 3 is a schematic diagram of a spacer relative to a black matrix element in a liquid crystal display panel according to an embodiment of the disclosure.

Particularly in FIG. 3, the spacer 04 may be a primary spacer or a secondary spacer. The edge of the black matrix covering the primary spacer extends beyond the edge of the primary spacer by 9 μm to 12 μm, and the edge of the black matrix covering the secondary spacer extends beyond the edge of the secondary spacer by 9 μm to 12 μm, so that an area around the spacer 04 where an image cannot be displayed normally can be shielded, but also the area of the black matrix 05 can be made smaller, thus resulting in a less influence upon an aperture ratio of pixel.

Optionally in the liquid crystal display panel according to the embodiment of the disclosure, as illustrated in FIG. 2, the primary spacers 041 are arranged at the intersection of two adjacent rows of sub-pixels 06 and two adjacent columns of sub-pixels 06. Particularly the plurality of primary spacers 041 each is arranged at the intersection of two adjacent rows of sub-pixels 06 and two adjacent columns of sub-pixels 06, so that the plurality of primary spacers 041 each with a given size may occupy less areas of the sub-pixels 06, thus reducing the areas of the sub-pixels 06 occupied by the black matrix elements 05 covering the primary spacers 041 so as to improve the aperture ratio of pixel of the liquid crystal display panel.

Optionally in the liquid crystal display panel according to the embodiment of the disclosure, as illustrated in FIG. 2, the secondary spacers 042 can also arranged at the intersection of two adjacent rows of sub-pixels 06 and two adjacent columns of sub-pixels 06. Particularly the plurality of secondary spacers 042 each are arranged at the intersection of two adjacent rows of sub-pixels 06 and two adjacent columns of sub-pixels 06, so that the plurality of secondary spacers 042 each with a given size may occupy less areas of the sub-pixels 06, thus reducing the areas of the sub-pixels 06 occupied by the black matrix elements 05 covering the secondary spacers 042 so as to improve the aperture ratio of pixel of the liquid crystal display panel.

Figure 4:
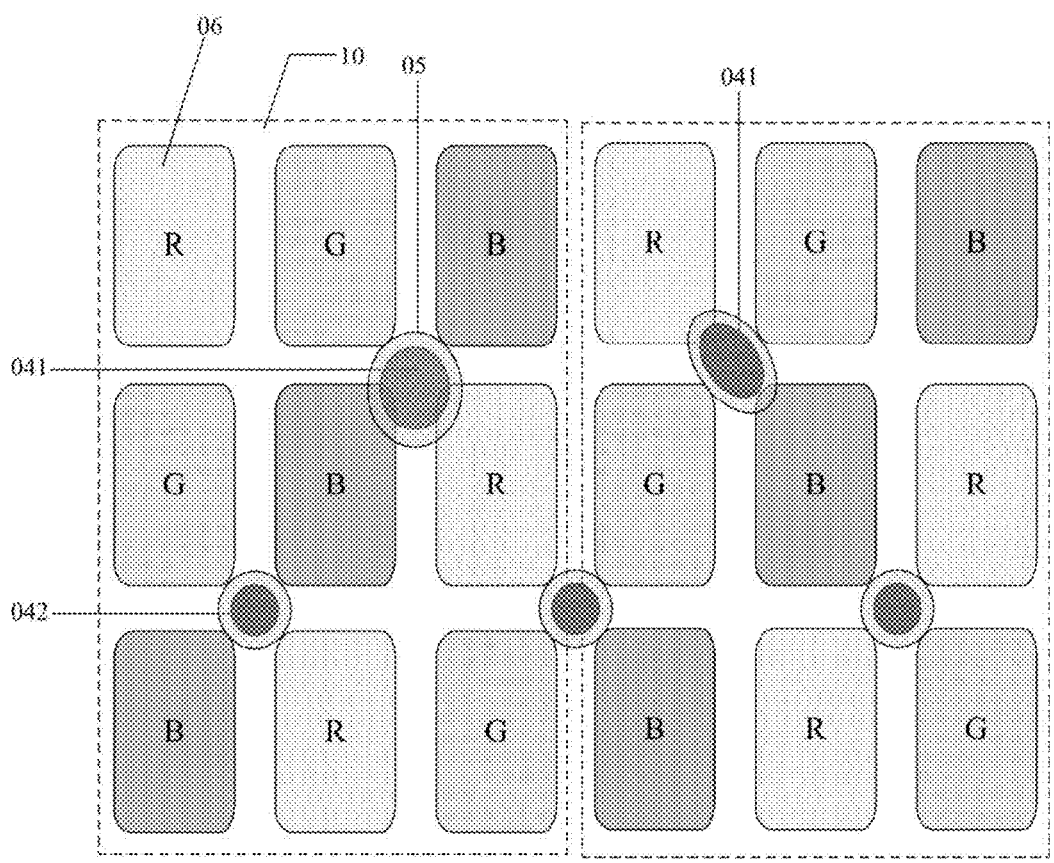
FIG. 4 is a top view schematic diagram of another liquid crystal display panel according to an embodiment of the disclosure.

If the pixels are arranged in the liquid crystal display panel as illustrated in FIG. 2, then some color may be displayed at each point (pixel) by mixing light at a plurality of sub-pixels 06. For example, each pixel includes one red sub-pixel 06, one green sub-pixel 06, and one blue sub-pixel 06. In order to improve a visual effect, there is a growing demand for the resolution of (the number of pixels in a unit area) the display panel, so the size of a sub-pixel is required to be smaller, but the size of a sub-pixel cannot be reduced indefinitely due to a process restriction. In order to improve the resolution given the size of a sub-pixel, a virtual display design in the Pentile mode has been proposed. In this mode, as illustrated in FIG. 4 which is a schematic structural diagram of another liquid crystal display panel according to an embodiment of the disclosure in a top view, a plurality of sub-pixels 06 on the array substrate 01 are arranged in a matrix where sub-pixels 06 in 3 rows by 3 columns are defined as a group of pixels 10 in which three sub-pixels 06 in each row are respectively in red (R), green (G), and blue (B), and three sub-pixels 06 in each column are respectively red (R), green (G), and blue (B). While an image is being displayed in reality, two adjacent sub-pixels 06 are defined as a pixel, and the pixel "borrows" a sub-pixel in the remaining color in a pixel adjacent thereto to define the three primary colors, so that each pixel shares the sub-pixel in that color absent in the pixel with the adjacent pixel to thereby display in white.

Particularly in the existing liquid crystal display panel in the Pentile mode, if the spacers are located at the intersections of two adjacent rows of sub-pixels and two adjacent columns of sub-pixels, then the spacers each will occupy at least one green sub-pixel, so if there is a difference between the areas of the sub-pixels occupied by the black matrix elements over the primary spacers, and the areas of the sub-pixels occupied by the black matrix elements over the secondary spacers, then there will be obvious regular black spots in a white picture and a green picture, thus resulting in a serious Mura phenomenon. Accordingly in the liquid crystal display panel in the Pentile mode as illustrated in FIG. 4 according to the embodiments of the disclosure, the overlapping areas of the black matrix elements 05 over the primary spacers 041, and the green sub-pixels 06, in the direction parallel to the array substrate 01 are equal to the overlapping areas of the black matrix elements 05 over the secondary spacers 042, and the green sub-pixels 06, in the direction parallel to the array substrate 01, so no matter at the intersections of whichever rows and whichever columns the spacers are arranged, the visual difference in brightness to the human eyes arising from the different areas of the green sub-pixels 06 occupied by the black matrix elements 04 corresponding to the primary spacers 041, and the black matrix elements 05 corresponding to the secondary spacers 042 can be addressed to thereby address the serious Mura phenomenon in the existing liquid crystal display panel in the Pentile mode.

Figure 5:
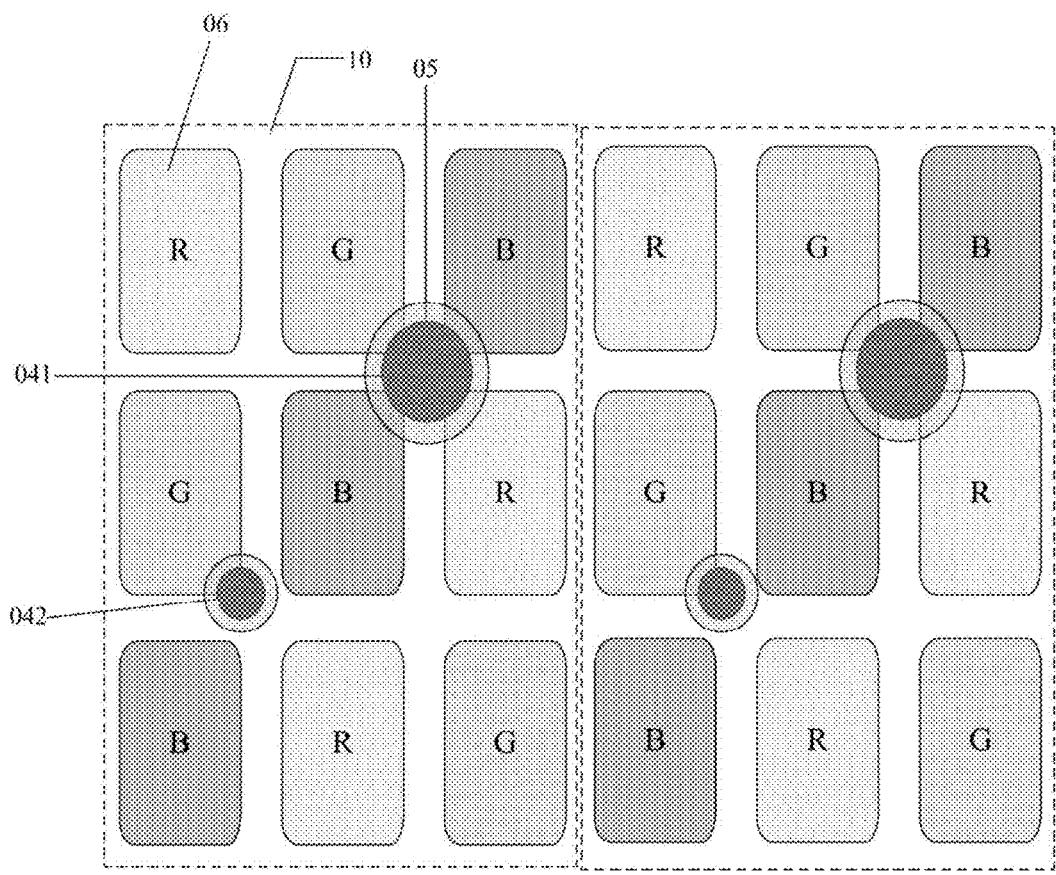
FIG. 5 is a top view of a schematic diagram of a liquid crystal display panel according to another embodiment of the disclosure.

Optionally in the liquid crystal display panel according to the embodiments of the disclosure, as illustrated in FIG. 5 which is a top view of a schematic structural diagram of a further liquid crystal display panel according to an embodiment of the disclosure, there is only one green sub-pixel 06 among four sub-pixels 06 adjacent to a primary spacer 041. Particularly since the human eyes are sensitive to green light, if less areas of the green sub-pixels 06 are occupied by the primary spacers 041, then there may be smaller areas of the green sub-pixels 06 occupied by the black matrix elements 05 corresponding to the primary spacers 041, so that there will be a smaller difference between an aperture ratio of the green sub-pixels 061 overlapping with the black matrix elements 05, and an aperture ratio of the green sub-pixels 061 non-overlapping with the black matrix elements 05, in the display panel to thereby improve the uniformity of brightness on the liquid crystal display panel.

Optionally in the liquid crystal display panel according to the embodiments of the disclosure, as illustrated in FIG. 5, the plurality of secondary spacers 042 each is arranged at the intersection of two adjacent rows of sub-pixels 06 and two adjacent columns of sub-pixels 06, and only one green sub-pixel 06 is arranged among four sub-pixels 06 adjacent to a secondary spacer 042. Particularly since the human eyes are sensitive to green light, if less areas of the green sub-pixels 06 are occupied by the secondary spacers 042, then there may be smaller areas of the green sub-pixels 06 occupied by the black matrix elements 05 corresponding to the secondary spacers 042, so that there will be a smaller difference between an aperture ratio of the green sub-pixels 061 overlapping with the black matrix elements 05, and an aperture ratio of the green sub-pixels 061 non-overlapping with the black matrix elements 05, in the display panel to thereby improve the uniformity of brightness on the liquid crystal display panel.

Figure 6:
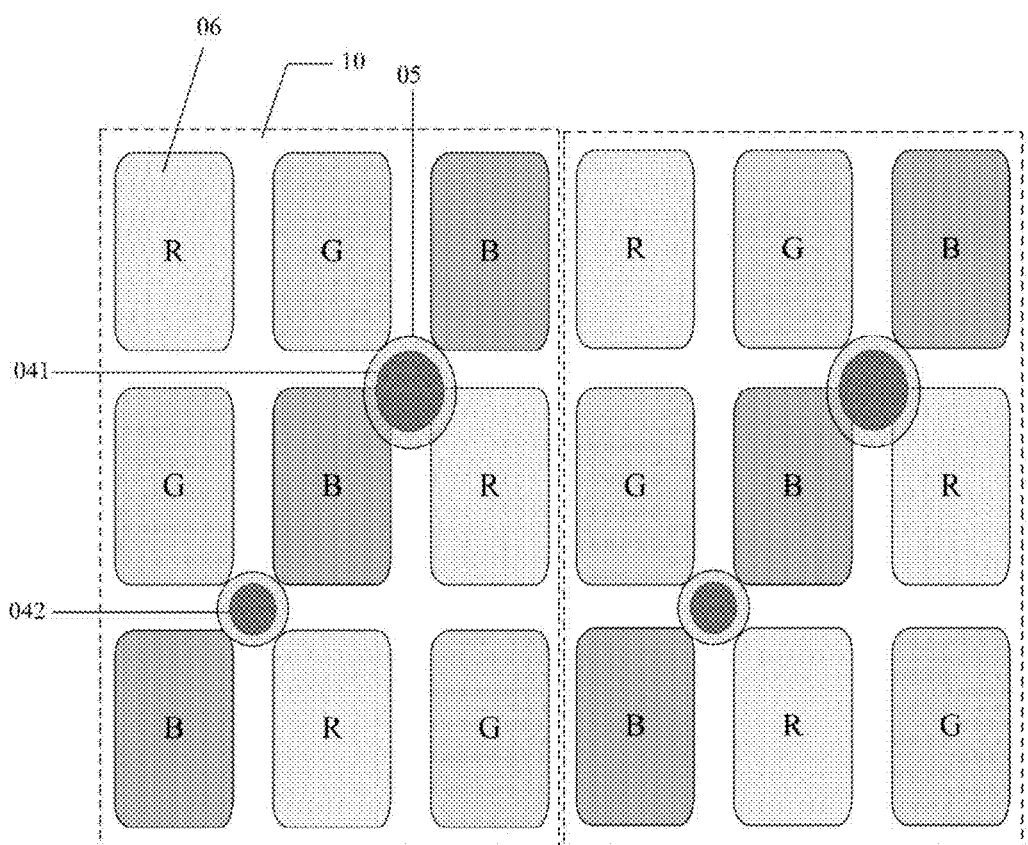
FIG. 6 is a top view schematic diagram of a liquid crystal display panel according to another embodiment of the disclosure.

Optionally in the liquid crystal display panel according to the embodiments of the disclosure, as illustrated in FIG. 6 which is a schematic structural diagram of a further liquid crystal display panel according to an embodiment of the disclosure in a top view, there are zero overlapping areas of the primary spacers 041 and the green sub-pixels 06 in the direction parallel to the array substrate. Particularly the overlapping areas of the primary spacers 041 and the green sub-pixels 06 in the direction parallel to the array substrate are reduced also for the purpose of smaller areas of the green sub-pixels 06 occupied by the black matrix element 05 corresponding to the primary spacers 041 to thereby improve the uniformity of brightness on the liquid crystal display panel.

Optionally in the liquid crystal display panel according to the embodiments of the disclosure, in order to achieve the zero overlapping areas of the primary spacers 041 and the green sub-pixels 06 in the direction parallel to the array substrate 01, as illustrated in FIG. 6, the primary spacers 041 can be shifted upward toward the sub-pixels in the other colors than green, that is, the primary spacers 041 do not occupy the green sub-pixels 06 at the cost of some reduction in the aperture ratios of the sub-pixels 06 in the other colors. Although the aperture ratios of the sub-pixels 06 in the other colors is lowered as compared with the existing liquid crystal display panel, this will not be easily visually perceivable to the human eyes insensitive to light in those colors.

Figure 7A:
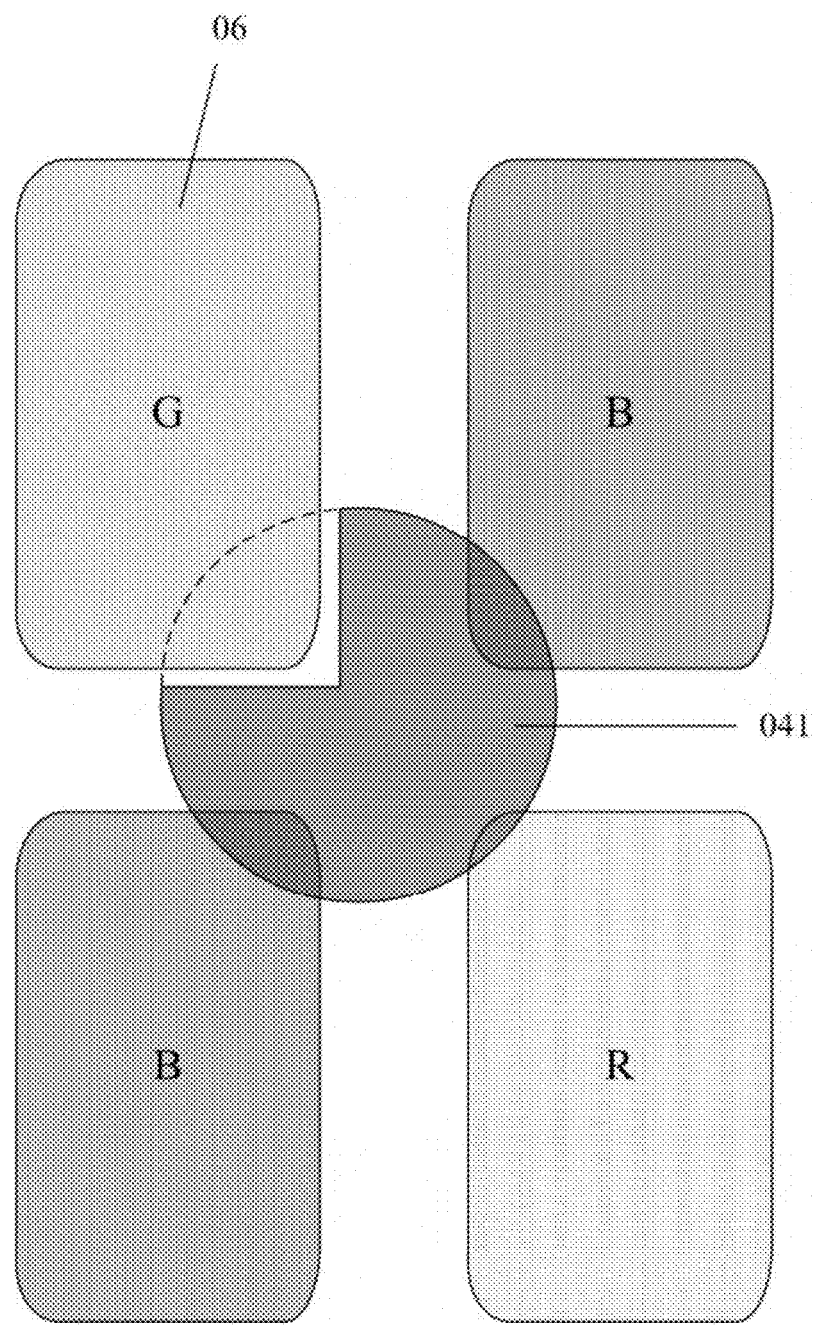
FIG. 7A is a schematic diagram of a primary spacer in a liquid crystal display panel according to an embodiment of the disclosure.
Figure 7B:
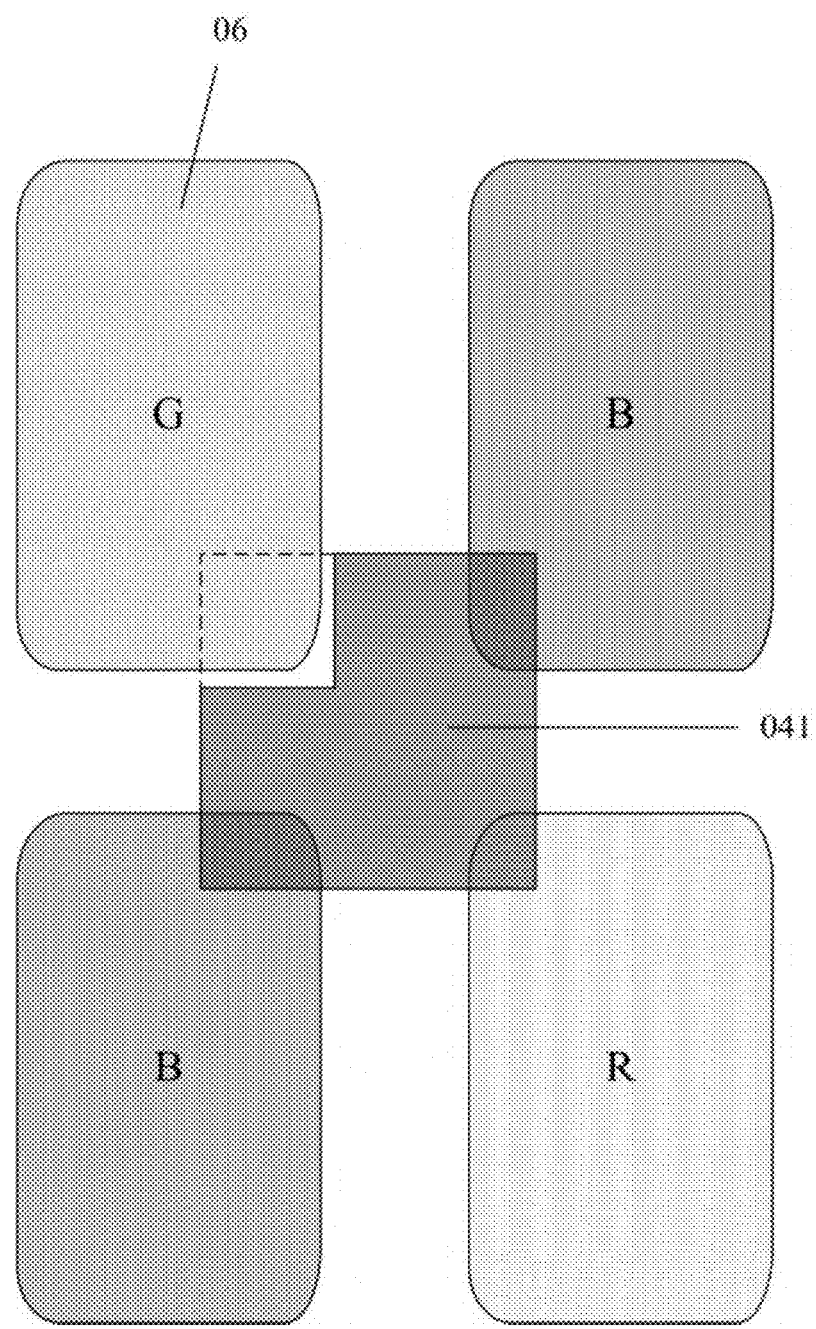
FIG. 7B is a schematic diagram of a primary spacer in a liquid crystal display panel according to another embodiment of the disclosure.
Figure 7C:
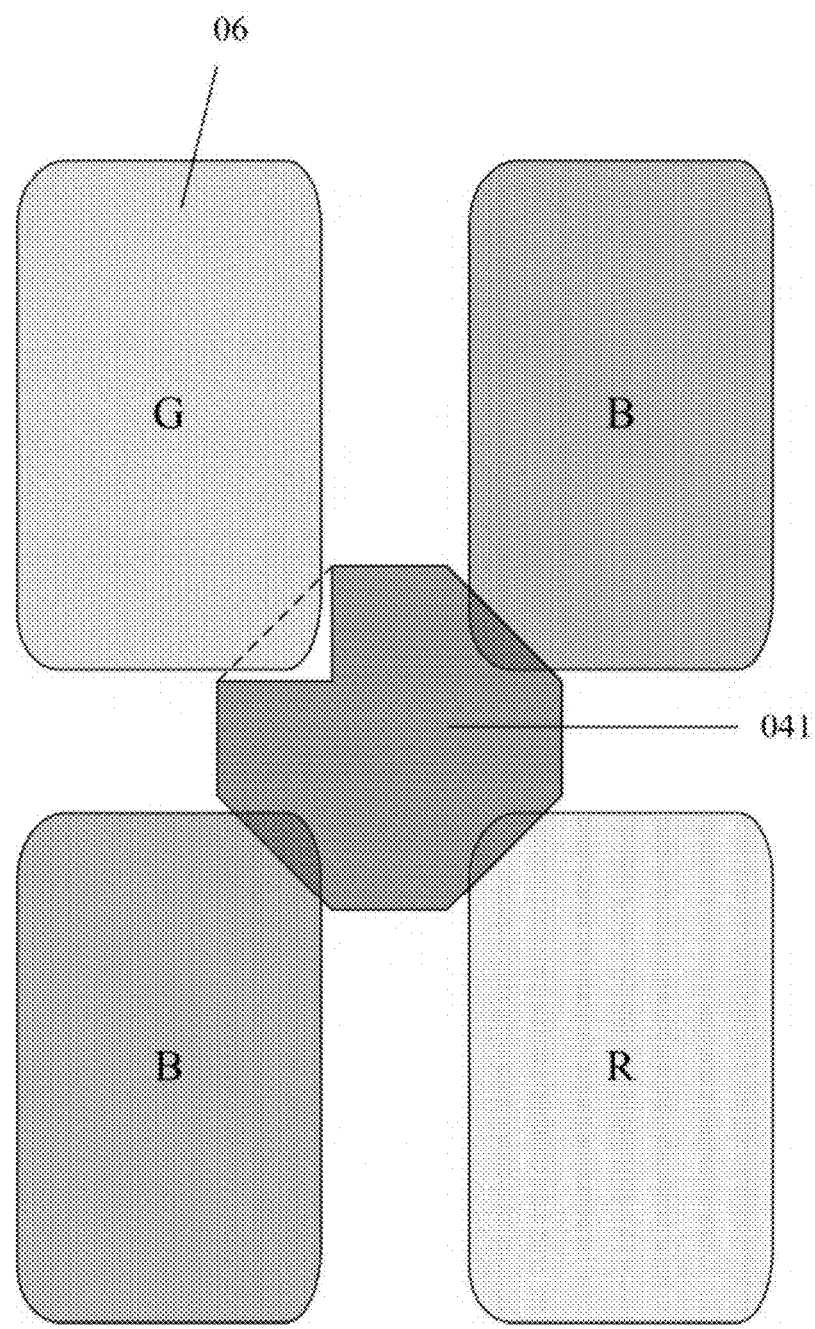
FIG. 7C is a schematic diagram of a primary spacer in a liquid crystal display panel according to another embodiment of the disclosure.

Optionally in the liquid crystal display panel according to the embodiment of the disclosure, in order to achieve the zero overlapping areas of the primary spacers 041 and the green sub-pixels 06 in the direction parallel to the array substrate 01, as illustrated in FIG. 7A to FIG. 7C, where FIG. 7A is a schematic structural diagram of a primary spacer in a liquid crystal display panel according to an embodiment of the disclosure, FIG. 7B is a schematic structural diagram of a primary spacer in another liquid crystal display panel according to an embodiment of the disclosure, and FIG. 7C is a schematic structural diagram of a primary spacer in a further liquid crystal display panel according to an embodiment of the disclosure, at least one of the primary spacers 041 has a recess area to avoid overlapping with a nearby green sub-pixels 06 of the primary spacers 041. As compared with the existing liquid crystal display panel, equivalently those parts of the primary spacers 041 overlapping with the green sub-pixels are cut away so that there will be no overlapping areas of the primary spacers 041 and the green sub-pixels 06 in the direction parallel to the array substrate 01 without sacrificing any aperture ratios of the sub-pixels in the other colors.

Particularly in the liquid crystal display panel according to the embodiments of the disclosure, the shape of cross sections of the primary spacers in the direction parallel to the array substrate can be any pattern non-overlapping with the green sub-pixels, e.g., a remaining part of a circle from which a dotted part is cut away as illustrated in FIG. 7A, a remaining part of a rectangle from which a dotted part is cut away as illustrated in FIG. 7B, and a remaining part of a hexagon from which a dotted part is cut away as illustrated in FIG. 7C, although the embodiments of the disclosure will not be limited thereto.

Optionally in the liquid crystal display panel according to the embodiments of the disclosure, as illustrated in FIG. 6, at least one of the plurality of secondary spacers 042 does not overlap with the green sub-pixels 06 in the direction parallel to the array substrate. Particularly the overlapping areas of the secondary spacers 042 and the green sub-pixels 06 in the direction parallel to the array substrate are reduced also for the purpose of smaller areas of the green sub-pixels 06 occupied by the black matrix elements 05 corresponding to the secondary spacers 042 to thereby improve the uniformity of brightness on the liquid crystal display panel.

Particularly in the liquid crystal display panel according to the embodiments of the disclosure, in order to achieve the zero overlapping areas of the secondary spacers and the green sub-pixels in the direction parallel to the array substrate, the secondary spacers can be shifted upward toward the sub-pixels in the other colors than green, that is, the secondary spacers do not occupy the green sub-pixels at the cost of some reduction in the aperture ratios of the sub-pixels in the other colors. Although the aperture ratios of the sub-pixels in the other colors is lowered as compared with the exiting liquid crystal display panel, this will not be easily visually perceivable to the human eyes insensitive to light in those colors.

Optionally if there are large placement areas of the secondary spacers in the liquid crystal display panel, then at least one of the secondary spacers may has a recess area to avoid overlapping with a nearby green sub-pixels of the secondary spacers. As compared with the existing liquid crystal display panel, equivalently those parts of the secondary spacers overlapping with the green sub-pixels are cut away so that there will be no overlapping areas of the secondary spacers and the green sub-pixels in the direction parallel to the array substrate without sacrificing any aperture ratios of the sub-pixels in the other colors. For particular shapes of cross sections of the secondary spacers in the direction parallel to the array substrate, reference can be made to the shapes of the cross sections of the primary spacers as illustrated in FIG. 7A to FIG. 7C.

Particularly in the liquid crystal display panel according to the embodiments of the disclosure, although the aperture ratio of the green sub-pixels can be improved by reducing the overlapping areas of the spacers and the green sub-pixels, the aperture ratios of the sub-pixels are still determined directly by the overlapping areas of the black matrix elements and the sub-pixels; and although the overlapping areas of the black matrix elements and the green sub-pixels can be reduced if there are zero overlapping areas of the spacers and the green sub-pixels, the black matrix elements may not non-overlap with the green sub-pixels because there are larger coverage areas of the black matrix elements than those of the spacers.

Figure 8A:
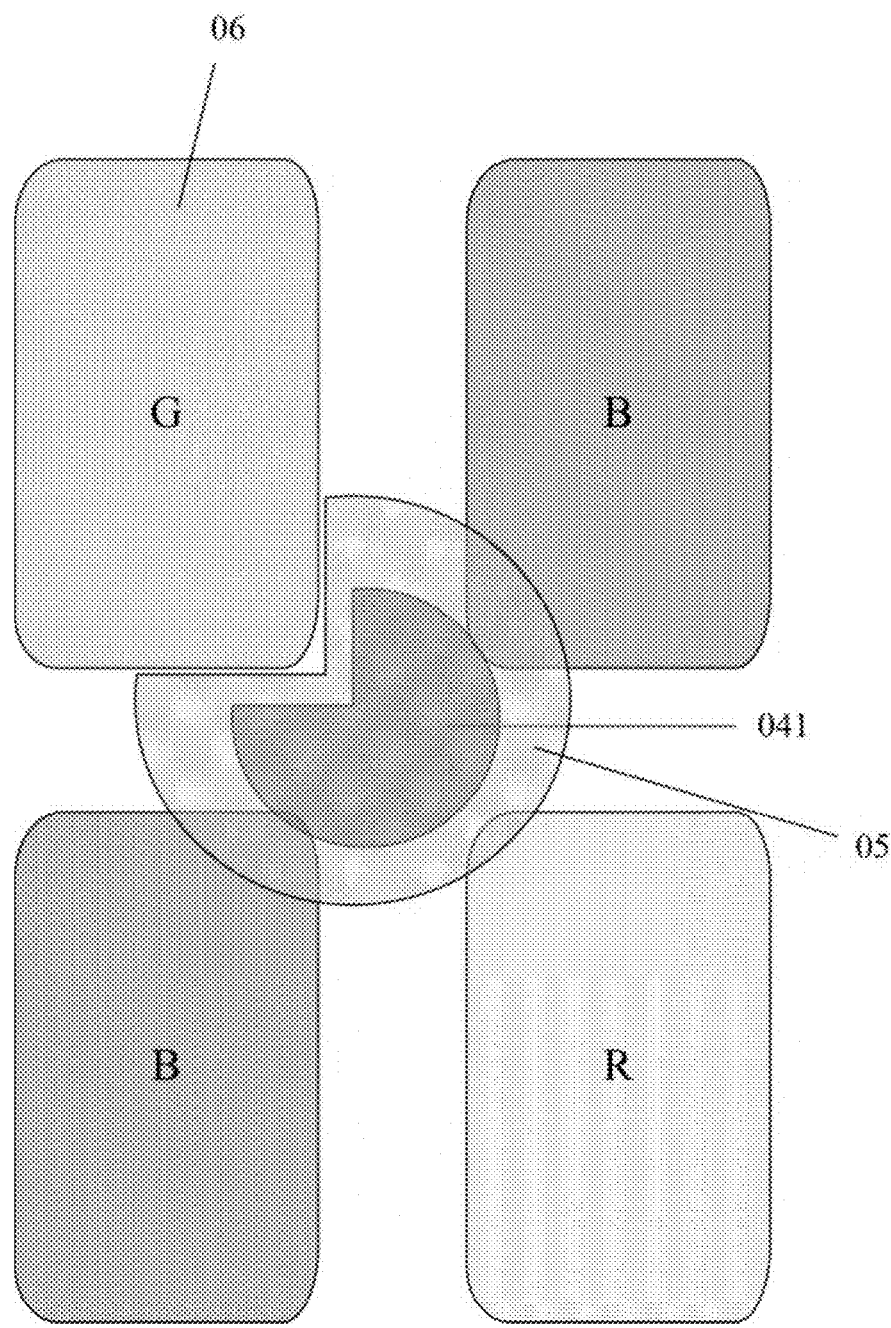
FIG. 8A is a schematic diagram of a black matrix element overlapping with a primary spacer in a liquid crystal display panel according to another embodiment of the disclosure.
Figure 8B:
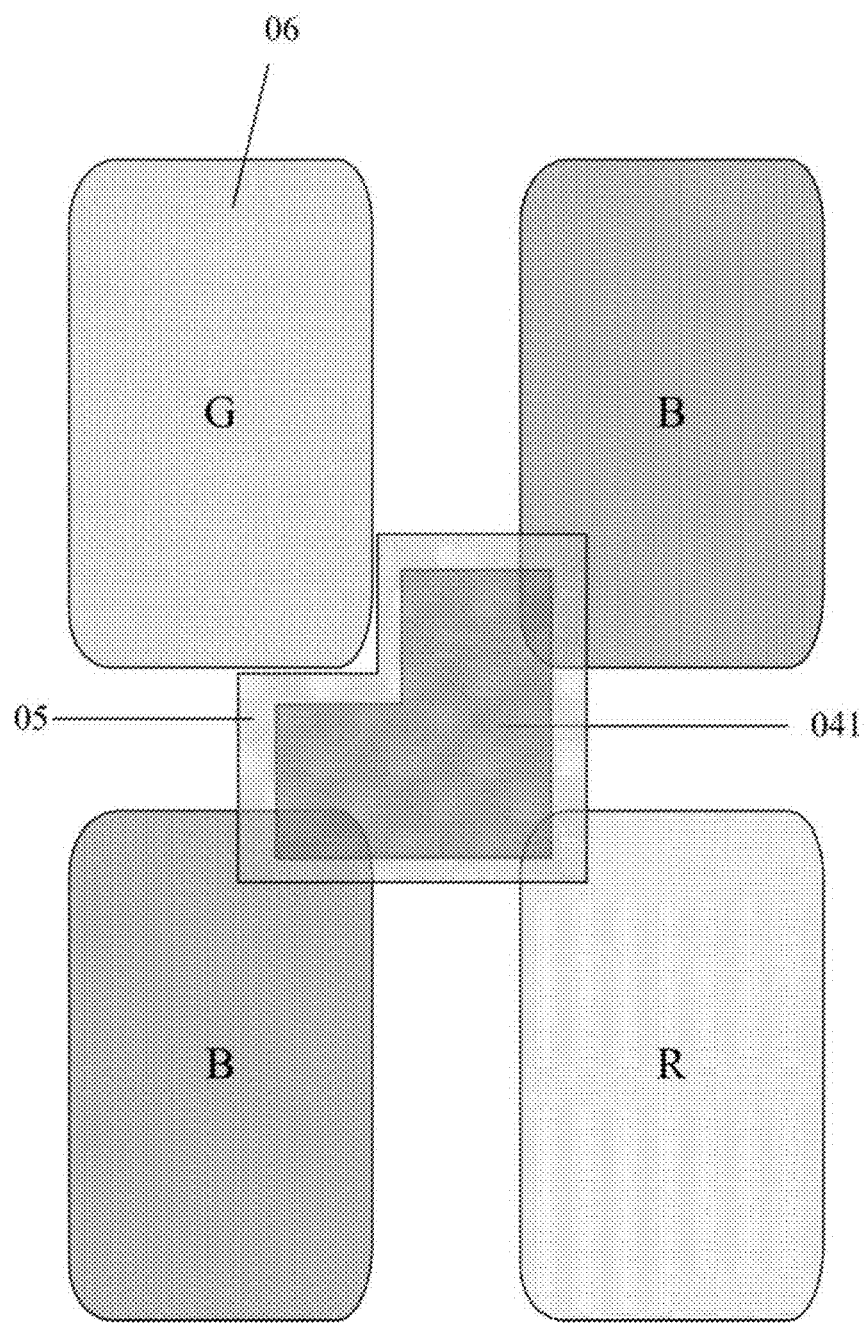
FIG. 8B is a schematic structural diagram of a black matrix unit overlapping with a primary spacer in liquid crystal display panel according to another embodiment of the disclosure.
Figure 8C:
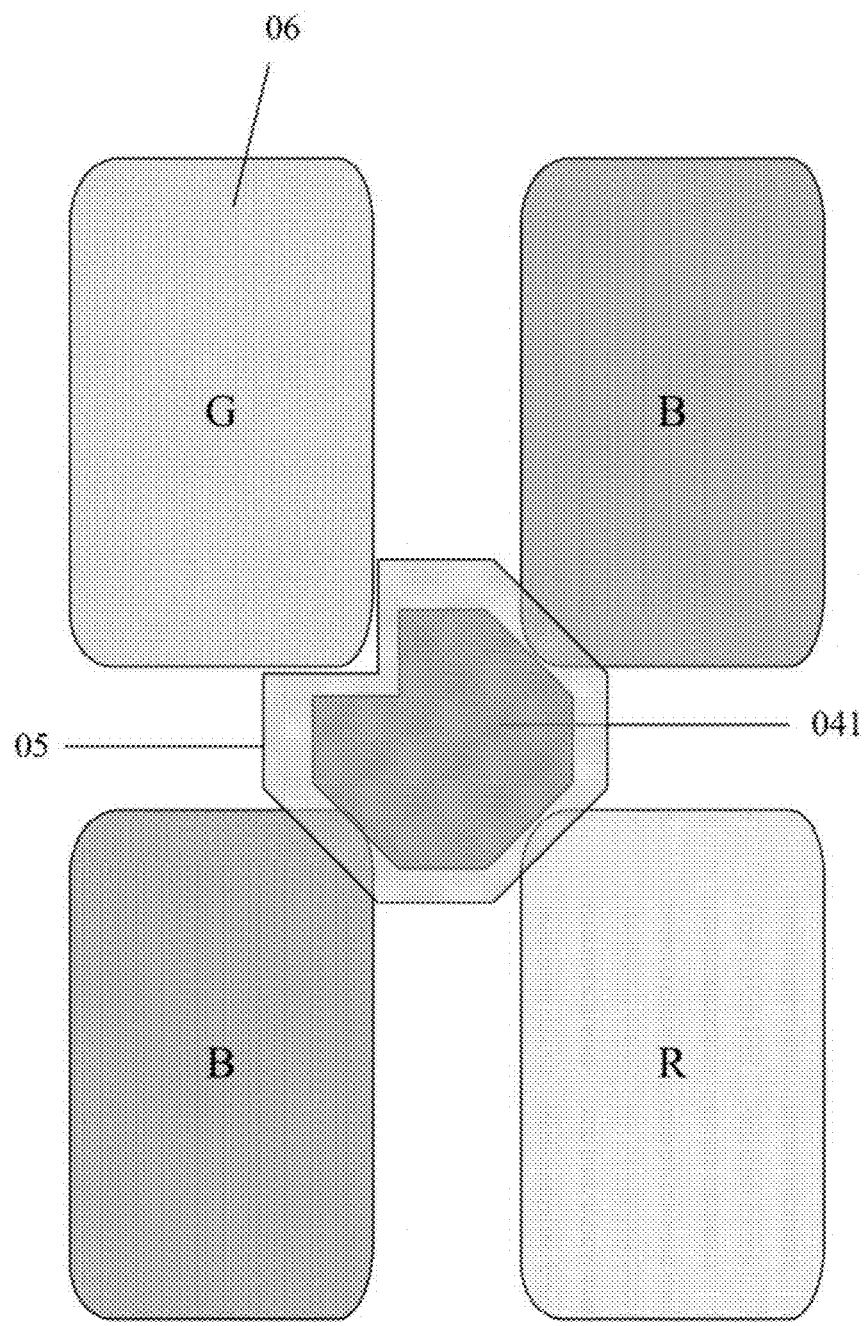
FIG. 8C is a schematic structural diagram of a black matrix corresponding to a primary spacer in a further liquid crystal display panel according to an embodiment of the disclosure.

Accordingly, optionally in the liquid crystal display panel according to the embodiments of the disclosure, as illustrated in FIG. 8A to FIG. 8C, where FIG. 8A is a schematic structural diagram of a black matrix corresponding to a primary spacer in a liquid crystal display panel according to an embodiment of the disclosure, FIG. 8B is a schematic structural diagram of a black matrix corresponding to a primary spacer in another liquid crystal display panel according to an embodiment of the disclosure, and FIG. 8C is a schematic structural diagram of a black matrix corresponding to a primary spacer in a further liquid crystal display panel according to an embodiment of the disclosure, there are zero overlapping areas of the black matrix elements 05 at the corresponding positions of the primary spacers 041, and the green sub-pixels 06, in the direction parallel to the array substrate, and zero overlapping areas of the black matrix element 05 at the corresponding positions of the secondary spacers 042, and the green sub-pixels 06, in the direction parallel to the array substrate. For particular shapes of cross sections of the black matrix elements corresponding to the secondary spacers in the direction parallel to the array substrate, reference can be made to the shape of the black matrix elements corresponding to the primary spacers as illustrated in FIG. 8A to FIG. 8C.

Optionally in the liquid crystal display panel according to the embodiments of the disclosure, the sub-pixels further include white sub-pixels; and overlapping areas of the black matrix elements at the corresponding positions of the primary spacers, and the white sub-pixels, in the direction parallel to the array substrate are equal to overlapping areas of the black matrix elements at the corresponding positions of the secondary spacers, and the white sub-pixels, in the direction parallel to the array substrate. Particularly if the color of a sub-pixel is white, then since light in the three primary colors including green light, blue light, and red light is mixed into white light, if there is a difference between the area of a white sub-pixel occupied by a black matrix at the corresponding position of a primary spacer, and the area of a white sub-pixel occupied by a black matrix at the corresponding position of a secondary spacer, then the green light will contribute the most to the white light, so the difference in brightness due to the difference in area will be easily perceivable to the human eyes. Accordingly in the technical solution according to the embodiments of the disclosure, the area of a white sub-pixel occupied by a black matrix at the corresponding position of a primary spacer can be made equal to the area of a white sub-pixel occupied by a black matrix at the corresponding position of a secondary spacer to thereby address the visual difference in brightness to the human eyes arising from the difference in placement between the primary spacer and the secondary spacer.

Optionally in the liquid crystal display panel according to the embodiments of the disclosure, there are zero overlapping areas of the primary spacers and the white sub-pixels in the direction parallel to the array substrate, and zero overlapping areas of the secondary spacers and the white sub-pixels in the direction parallel to the array substrate.

Optionally in the liquid crystal display panel according to the embodiments of the disclosure, there are zero overlapping areas of the black matrix elements at the corresponding positions of the primary spacers and the white sub-pixels in the direction parallel to the array substrate, and zero overlapping areas of the black matrix elements at the corresponding positions of the secondary spacers and the white sub-pixels in the direction parallel to the array substrate.

Particularly the liquid crystal display panel according to the embodiments of the disclosure further includes white sub-pixels, and for a positional relationship between the spacers and the white sub-pixels, and reference can be made to the setting of the spacers and the green sub-pixels in the embodiments above, so a repeated description thereof will be omitted here.

Figure 9:
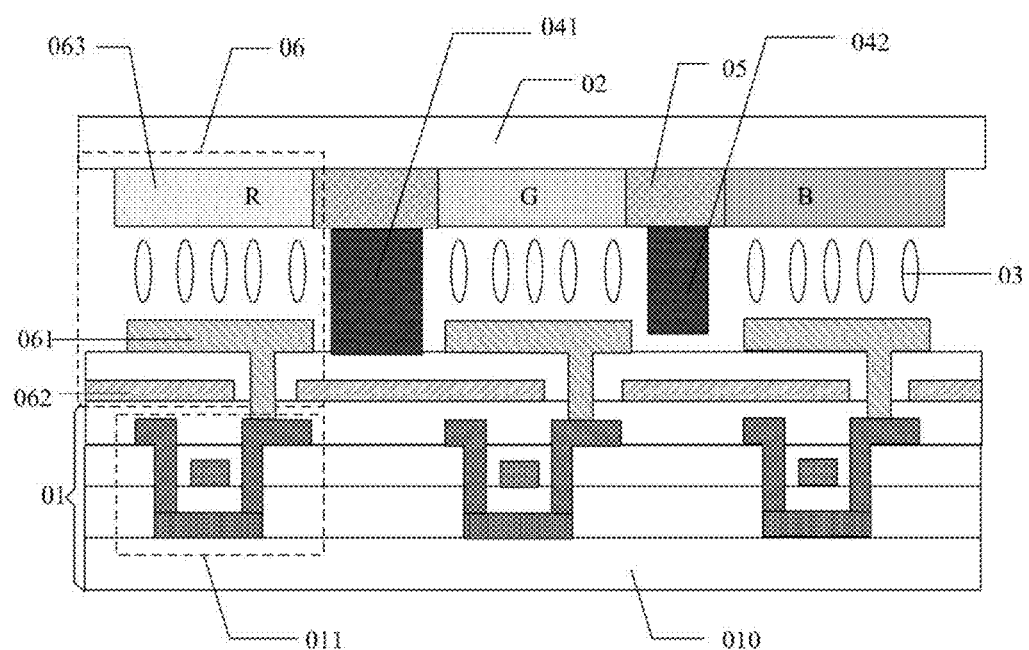
FIG. 9 is a cross sectional view diagram of a liquid crystal display panel according to an embodiment of the disclosure.

Particularly in the liquid crystal display panel according to the embodiments of the disclosure, the array substrate includes a base substrate, thin film transistors located on the base substrate and corresponding to respective pixel electrodes, and an insulation layer covering the thin film transistors, where the pixel electrodes are electrically connected with the corresponding thin film transistors through-holes running through the insulation layer. As illustrated in FIG. 9 which is a schematic structural diagram of another liquid crystal display panel according to an embodiment of the disclosure in a sectional view, for example, the array substrate 01 includes a base substrate 010, and thin film transistors 011 located on the array substrate 010 and corresponding to respective pixel electrodes 061, where the pixel electrodes 061 are electrically connected with their corresponding thin film transistors 011 through-holes.

Particularly the liquid crystal display panel according to the embodiments of the disclosure further includes some other indispensable film layers constituting the liquid crystal display panel, and reference can be made to the existing liquid crystal display panel for the setting of these film layers, so a detailed description thereof will be omitted here.

Figure 10:
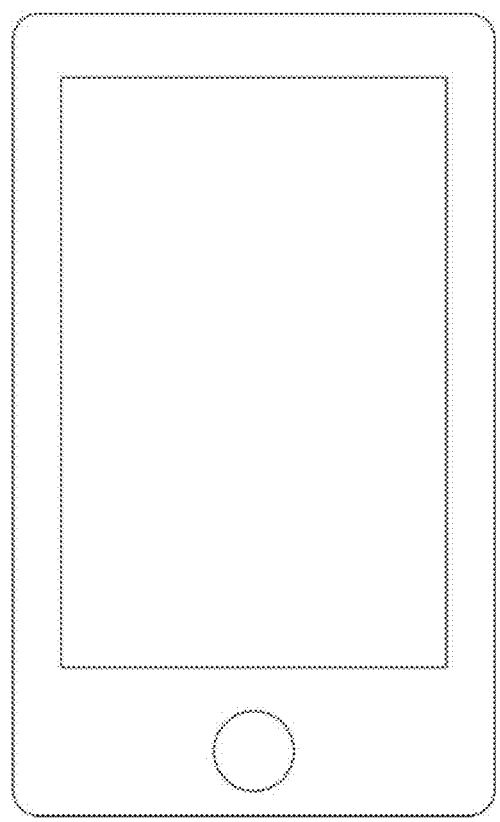
FIG. 10 is a schematic diagram of a display device according to an embodiment of the disclosure.

Based upon the same inventive idea, an embodiment of the disclosure further provides a display device as illustrated in FIG. 10 which is a schematic structural diagram of a display device according to an embodiment of the disclosure, where the display device includes the liquid crystal display panel according to any one of the embodiments above according to the disclosure. The display device can be a mobile phone, a tablet computer, a TV set, a display, a notebook computer, a digital photo frame, a navigator, and any other product or component capable of displaying. Reference can be made to the embodiments of the liquid crystal display panel above for an implementation of the display device, so a repeated description thereof will be omitted here.

In the liquid crystal display panel and the display device above according to the embodiments of the disclosure, the liquid crystal display panel includes the array substrate and the upper substrate arranged opposite to each other, and the liquid crystal layer, the spacer layer having a plurality of spacers underpinning the liquid crystal layer, wherein the plurality of spacers include a plurality of primary spacers and a plurality of secondary spacers, and a black matrix layer including a plurality of black matrix elements over the spacer layer, all of which are located between the array substrate and the upper substrate, where there are further arranged a sub-pixel layer including a plurality of sub-pixels in at least red, green, and blue color types on the array substrate. If there is a difference between the areas of the sub-pixels occupied by the black matrix elements over the primary spacers, and the areas of the sub-pixels occupied by the black matrix elements over the secondary spacers, where there are larger placement areas of the primary spacers, then the brightness at the corresponding positions of the primary spacers may be lower than the brightness at the corresponding positions of the secondary spacers. However the human eyes are sensitive to green light in reality, so if the difference in brightness due to the difference in area is reflected on the sub-pixels in another color, then the difference in brightness may not be easily perceivable to the human eyes, and only if the difference in brightness is reflected on the green sub-pixels, then the visual difference in brightness may be obvious. Accordingly in the technical solutions according to the embodiments of the disclosure, the overlapping area between one of the plurality of black matrix elements and a green sub-pixel near one of the plurality of primary spacers below said matrix element forms the first overlap area, where the overlapping area between one of the plurality of black matrix elements and a green sub-pixel near one of the plurality of secondary spacers below said matrix element forms the second overlap area, and the first overlap area equals the second overlap area, that is, the areas of the green sub-pixels occupied by the black matrix elements over the primary spacers are equal to the areas of the green sub-pixels occupied by the black matrix elements over the secondary spacers, thus addressing the visual difference in brightness to the human eyes arising from the difference in placement area between the primary spacers and the secondary spacers so as to address the Mura phenomenon in the existing liquid crystal display panel.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

What is claimed is:

1. A liquid crystal display panel, comprising:
   an array substrate and an upper substrate arranged opposite to each other;
   a liquid crystal layer;
   a spacer layer having a plurality of spacers underpinning the liquid crystal layer, wherein the plurality of spacers includes a plurality of primary spacers and a plurality of secondary spacers;
   a sub-pixel layer on the array substrate comprising a plurality of sub-pixels in at least red, green, and blue color types, wherein the plurality of sub-pixels is arranged in columns and rows; and
   a black matrix layer comprising a plurality of black matrix elements over the spacer layer;
   wherein the plurality of black matrix elements comprises a plurality of first black matrix elements covering the plurality of primary spacers and a plurality of second black matrix elements covering the plurality of secondary spacers;
   wherein the liquid crystal layer, the spacer layer, the sub-pixel layer, and the black matrix layer are disposed between the array substrate and the upper substrate;
   wherein an overlapping area between each of the plurality of first black matrix elements and a green sub-pixel near one of the plurality of primary spacers below said first black matrix element forms a first overlap area, wherein an overlapping area between each of the plurality of second black matrix elements and a green sub-pixel near one of the plurality of secondary spacers below said second black matrix element forms a second overlap area; and
   wherein the first overlap area equals the second overlap area.

2. The liquid crystal display panel according to claim 1, wherein the plurality of primary spacers each is arranged at an intersection of two adjacent rows of the sub-pixels, and two adjacent columns of the sub-pixels.

3. The liquid crystal display panel according to claim 2, wherein the plurality of sub-pixels on the array substrate are arranged in a matrix where sub-pixels in 3 rows by 3 columns are defined as a group of pixels in which three sub-pixels in each row are respectively in red, green, and blue, and three sub-pixels in each column are respectively in red, green, and blue.

4. The liquid crystal display panel according to claim 3, wherein only one green sub-pixel is arranged among four sub-pixels adjacent to each of the plurality of primary spacers.

5. The liquid crystal display panel according to claim 4, wherein the plurality of secondary spacers each is arranged at the intersection of two adjacent rows of the sub-pixels and two adjacent columns of the sub-pixels, and wherein only one green sub-pixel is arranged among four sub-pixels adjacent to each of the plurality of secondary spacers.

6. The liquid crystal display panel according to claim 1, wherein at least one of the primary spacers does not overlap with a green sub-pixel.

7. The liquid crystal display panel according to claim 6, wherein at least one of the plurality of primary spacers has a recess area to avoid overlapping with a nearby green sub-pixel.

8. The liquid crystal display panel according to claim 6, wherein at least one of the secondary spacers does not overlap with a green sub-pixel.

9. The liquid crystal display panel according to claim 8, wherein at least one of the plurality of secondary spacers has a recess area to avoid overlapping with a nearby green sub-pixel.

10. The liquid crystal display panel according to claim 1, wherein the plurality of sub-pixels further comprises white sub-pixels; and
   wherein an overlapping area between each of the plurality of first black matrix elements and a white sub-pixel near one of the plurality of primary spacers below said first black matrix element forms a third overlap area, wherein an overlapping area between each of the plurality of second black matrix elements and a white sub-pixel near one of the plurality of secondary spacers below said second black matrix element forms a fourth overlap area; and
   wherein the third overlap area equals the fourth overlap area.

11. The liquid crystal display panel according to claim 10, wherein at least one of the primary spacers does not overlap with a white sub-pixel; wherein at least one of the secondary spacers does not overlap with a white sub-pixel.

12. The liquid crystal display panel according to claim 1, wherein the at least one of the plurality of black matrix elements overlapping with one of the plurality of spacers is wider than the spacer in a range of 9 μm to 12 μm.

13. A display device, comprising the liquid crystal display panel, wherein the liquid crystal display panel comprises:
   an array substrate and an upper substrate arranged opposite to each other;
   a liquid crystal layer;
   a spacer layer having a plurality of spacers underpinning the liquid crystal layer, wherein the plurality of spacers includes a plurality of primary spacers and a plurality of secondary spacers;
   a sub-pixel layer on the array substrate comprising a plurality of sub-pixels in at least red, green, and blue color types, wherein the plurality of sub-pixels are arranged in columns and rows; and
   a black matrix layer comprising a plurality of black matrix elements over the spacer layer;
   wherein the plurality of black matrix elements comprises a plurality of first black matrix elements covering the plurality of primary spacers and a plurality of second black matrix elements covering the plurality of secondary spacers;
   wherein the liquid crystal layer, the spacer layer, the sub-pixel layer, and the black matrix layer are disposed between the array substrate and the upper substrate;
   wherein an overlapping area between each of the plurality of first black matrix elements and a green sub-pixel near one of the plurality of primary spacers below said first black matrix element forms a first overlap area, wherein an overlapping area between each of the plurality of second black matrix elements and a green sub-pixel near one of the plurality of secondary spacers below said second black matrix element forms a second overlap area; and
   wherein the first overlap area equals the second overlap area.

* * * * *